(12) United States Patent
Han et al.

(10) Patent No.: US 9,363,335 B2
(45) Date of Patent: Jun. 7, 2016

(54) METHOD AND APPARATUS THAT ENABLES A WEB-BASED CLIENT-SERVER APPLICATION TO BE USED OFFLINE

(71) Applicants: Soonbo Han, Seoul (KR); Dongyoung Lee, Seoul (KR)

(72) Inventors: Soonbo Han, Seoul (KR); Dongyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 13/663,948

(22) Filed: Oct. 30, 2012

(65) Prior Publication Data
US 2013/0110963 A1   May 2, 2013

Related U.S. Application Data

(60) Provisional application No. 61/553,231, filed on Oct. 30, 2011.

(51) Int. Cl.
*H04L 29/06* (2006.01)
*G06F 15/167* (2006.01)
*G06F 15/16* (2006.01)

(52) U.S. Cl.
CPC ..................................... *H04L 67/42* (2013.01)

(58) Field of Classification Search
CPC ... G06F 17/30902; G06F 9/541; H04L 12/14; H04L 67/42

USPC .......... 709/213, 203, 250, 217–219; 707/769; 455/405
See application file for complete search history.

(56) References Cited

U.S. PATENT DOCUMENTS

| | | | |
|---|---|---|---|
| 7,020,750 B2 * | 3/2006 | Thiyagaranjan et al. ...... | 711/141 |
| 7,814,234 B2 * | 10/2010 | Hawkins et al. .............. | 709/250 |
| 2003/0115420 A1 * | 6/2003 | Tsirigotis et al. ............. | 711/133 |
| 2007/0033588 A1 * | 2/2007 | Landsman .................... | 717/178 |
| 2008/0005657 A1 * | 1/2008 | Sneh .......................... | 715/501.1 |
| 2008/0104256 A1 * | 5/2008 | Olston ......................... | 709/223 |
| 2008/0301221 A1 * | 12/2008 | Arvidsson ............... | G06F 9/541 709/203 |
| 2010/0174861 A1 * | 7/2010 | Katz et al. ..................... | 711/113 |
| 2010/0332513 A1 * | 12/2010 | Azar et al. ................... | 707/769 |
| 2011/0151831 A1 * | 6/2011 | Pattabiraman ............... | 455/405 |

* cited by examiner

*Primary Examiner* — David Lazaro
*Assistant Examiner* — Zi Ye
(74) *Attorney, Agent, or Firm* — Ked & Associates, LLP

(57) ABSTRACT

The present invention is directed to method and apparatus that enables a web-based client-server application to be used offline that substantially obviate one or more problems due to limitations and disadvantages of the related art. According to one aspect of the present invention, a method for using a web-based client-server application offline, the method comprise: reading a markup file including a list of web resource file and period information; connecting periodically to web server according to the period information; downloading the web resource file included in the markup file form the web server to a cache included in the application.

8 Claims, 8 Drawing Sheets

COMPUTING ENVIRONMENT 100

COMPUTING ENVIRONMENT 100

FIG. 3a

```
/**
 * Calls the callback function with an array of of email addresses returned
 * from the server
 * @param { Function } callback The function to call with the data
 */
function gerAutCompleteEmailAddresses (callback) {
  ver xhr = new XMLHttpRequest ( ) ;
  xhr.open ( 'GET', getAutoCompleteUri ( ), true ) ;
  xhr.onload = function ( )   {
     callback ( xhr.responscText.split ( '/n' ) ) ;
   } ;
  xhr. send (null) ;
}
```

FIG. 3b

```
/**
 * Creates a function that will call different servers depending on wich
 * server to use .
 * @param { Function } f  The function to create a proxy for.
 * @param { String } type Something identifying what kind of request this is
 * @return { function } The new function that should replace the original
 */
function createProxy (f, type )  {
   return function ( )  {
      var params = argument ;
      if (useServerA)   { // original server
         return f . apply ( null, params) ;
      } else if (useServerB)  {
         switch ( type ) {
            case 'autocomplete' :
               var callback = params [0] ;
               callback ( [ 'a@domain.com' , 'b@domain.com' ] ) ;
               break ;
            ...
         }
      } else if (useServerC)  {
         ...
      } ...
   } ;
}

// replace original function with the proxied function
getAutoCompleteEmailAddresses =
   createProxy ( getAutoCompleteEmailAddresses , 'autocomplete' ) ;
```

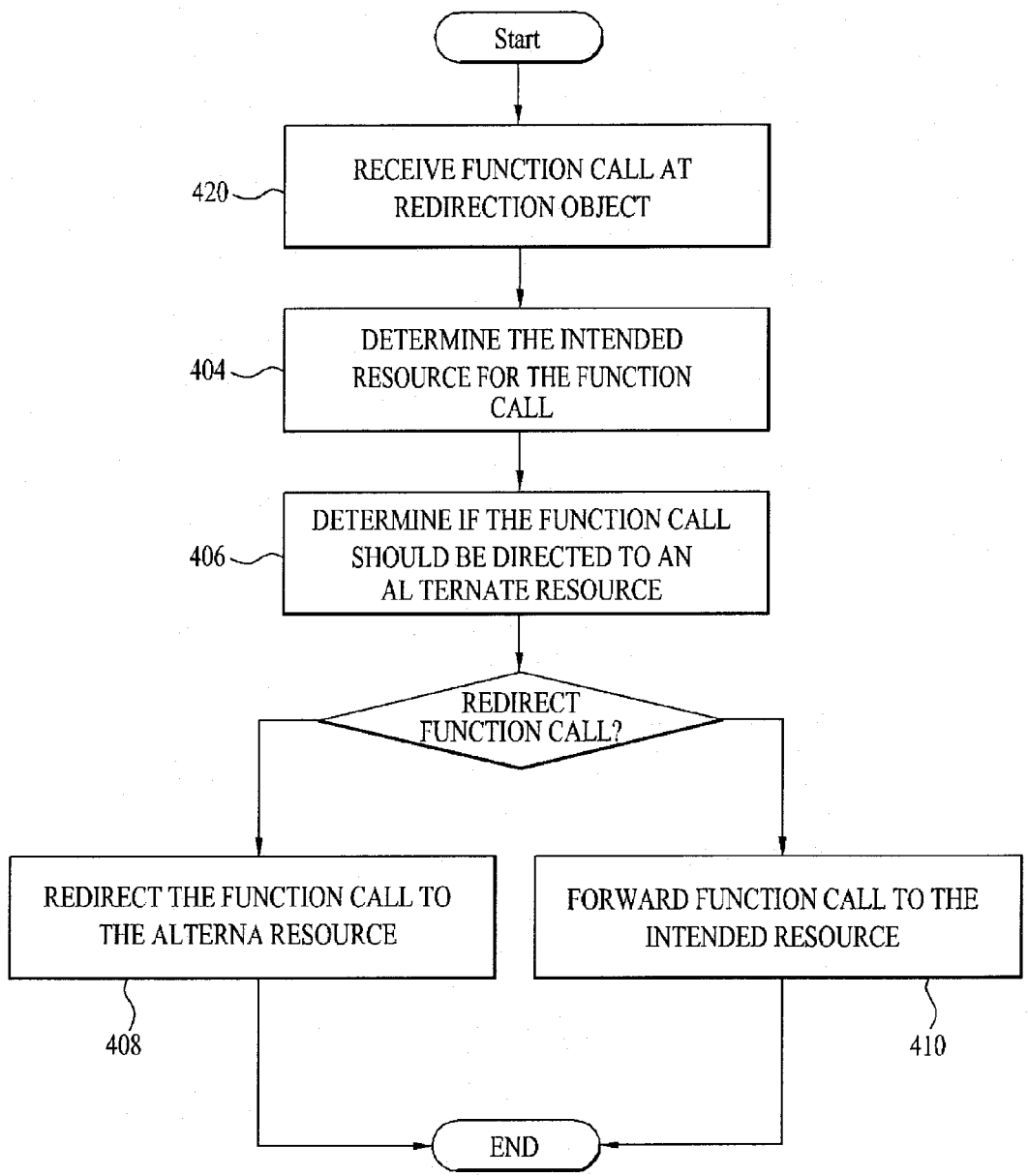

FIG. 7

```
clock.appcache

CACHE MANIFEST
clock.js
clock.css

FALLBACK :
/image/image/fallback.jpg

NETWORK :

PERIODICAL :
time.xml
```

400

METHOD AND APPARATUS THAT ENABLES A WEB-BASED CLIENT-SERVER APPLICATION TO BE USED OFFLINE

This application claims the benefit of U.S. Provisional Patent Application No. 61/553,231 filed on, Oct. 30, 2011 which is hereby incorporated by reference as if fully set forth herein.

BACKGROUND OF THE INVENTION

1. Field of the Invention

The present invention relates to web browsers. More specifically, the present invention relates to a method and an apparatus that enables a web-based client-server application to be used offline.

2. Discussion of the Related Art

Scripting languages and dynamic components are often used in web pages to provide complex functionality to a user. Web servers process many of these scripts and components, and send the resulting output HyperText Markup Language (HTML) code to a browser for display to the user. However, this type of client-server web application requires a connection to the web server to be able to use the client-server web application.

In order to facilitate offline browsing, browsers typically provide a caching mechanism which enables every web page that is delivered to the browser to be stored in a browser cache. At some subsequent time, if the user attempts to view a previously viewed page and the client does not have a connection to the web server that hosted the web page, the browser can retrieve a copy of the web page from the browser cache and can display the copy of the web page to the user.

Modern web applications deliver display logic and data to the browser, such as JavaScript with HTML. Sometime this data has been preformatted for display purpose and sometimes the data is very raw. In either case, the files that are cached are only a snapshot of the data at one point in time, and may be irrelevant to the user at a subsequent time. Moreover, in many instances, the web application prevents this data from being cached.

Consider the example of a browser-based email application. If the browser cache only contains a static representation of the web page from the last time the user visited the browser-based email site, then the web page retrieved from the cache will not be very useful to the user. If the user is only presented with static representations of what was previously viewed, and the server-side logic is not being executed, then the user's actions on the cached pages do not result in the actions intended by the user. Moreover, this can lead to confusion because the user might believe that he or she performed some action that was actually not performed because the server-side logic was not executed.

Hence, what is needed is a method and an apparatus for viewing dynamic web pages in a browser without the problems listed above.

SUMMARY OF THE INVENTION

Accordingly, the present invention is directed to method and apparatus that enables a web-based client-server application to be used offline that substantially obviate one or more problems due to limitations and disadvantages of the related art.

According to one aspect of the present invention, a method for using a web-based client-server application offline, the method comprise: reading a markup file including a list of web resource file and period information; connecting periodically to web server according to the period information; downloading the web resource file included in the markup file form the web server to a cache included in the application.

The method further comprises: checking periodically whether the web resource file is updated in the web server; and downloading the updated web resource file included in the markup file form the web server to the cache.

The method further comprises: presenting a web page using the downloaded web resource file on offline status.

The period information is specified in a manifest file included in the markup file.

The period information is set up by at least one of an author of the application and a user of the application and the application.

The period information is set up by considering to at least one of a web server's priority, and a specified period, and number of visits (frequency of use), and a recently visited site.

The period information is set up by considering to at least one of a visit history, and a update frequency of the web resource, and the current network usage.

The period information is set up by considering to at least one of a network situation (3G/Wifi/wired/roaming/etc.), and whether the amount remaining in the current plan data, and a current time (day or night).

According to another aspect of the present invention, a computer-readable storage medium storing instructions that when executed by a computer cause the computer to perform a method for using a web-based client-server application offline, the method comprising: reading a markup file including a list of web resource file and period information; connecting periodically to web server according to the period information; downloading the web resource file included in the markup file form the web server to a cache included in the application.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3A illustrates an AJAX function in accordance with an embodiment of the present invention.

FIG. 3B illustrates a proxy AJAX function in accordance with an embodiment of the present invention.

FIG. 4 presents a flow chart illustrating the process of redirecting a function call in accordance with an embodiment of the present invention.

FIG. 7 illustrates a markup file including period information in accordance with the other embodiment of the present invention.

DETAILED DESCRIPTION OF THE INVENTION

Figure 1:
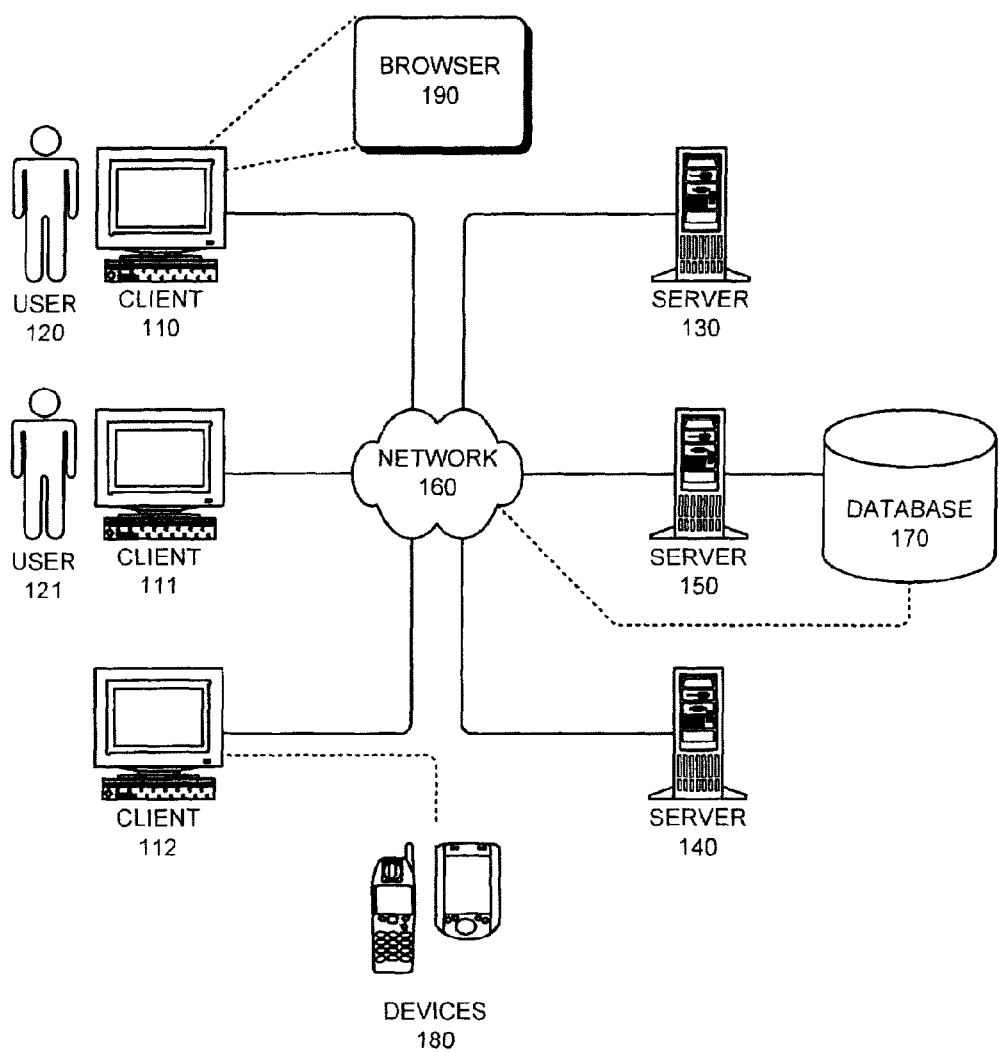
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

One embodiment of the present invention provides a system that facilitates using a web-based client-server application offline. During operation, the system receives a function call at an object within a browser which is executing on a client, wherein the function call is generated by the web-based client-server application and is directed to the browser's communication layer on the client. Next, the system determines an intended resource for the function call. The system also determines if the function call should be redirected to an alternate resource within the web-application. If so, the system redirects the function call to the alternate resource. If not, the system forwards the function call to the intended server-based resource.

In some embodiments of the present invention, the alternate resource replicates the actions of a server-based resource. In these embodiments, the alternate resource performs the functions of the server-based resource which makes it appear that the client is communicating with the server. While the alternate resource replicates the actions of the server, the alternate resource may or may not execute the same code as the server. In many embodiments, the alternate resource executes different code that performs similar functionality as the server. Note that the alternate resource may include client-side.

Asynchronous JavaScript and XML (AJAX) to replicate the functionality of the server-side components to present a similar view to a user as if the client was communicating with the server.

In some embodiments of the present invention, determining if the function call should be redirected to an alternate resource involves determining if the client is working in an offline mode.

In some embodiments of the present invention, determining if the function call should be redirected to an alternate resource involves determining if the intended resource is not reachable.

In some embodiments of the present invention, determining if the function call should be redirected to an alternate resource involves receiving a redirection command from the web-based client-server application.

In some embodiments of the present invention, the intended resource is located on a server and the alternate resource is located on the client.

In some embodiments of the present invention, the web-based client-server application is an Asynchronous JavaScript and XML (AJAX) application.

In some embodiments of the present invention, redirecting the function call involves redirecting the function call in a manner that is not visible to a user.

In some embodiments of the present invention, the object is part of the browser.

In some embodiments of the present invention, the object is a browser extension.

In some embodiments of the present invention, the object is external to the browser, and has hooks into a framework of the browser.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network, such as network 160.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Browser 190 is installed on client 110. In one embodiment of the present invention, browser 190 can include any program that is capable of displaying web pages that include scripts. Note that browser 190 can be installed on any computational device, such as clients 110-112, servers 130-150, and devices 180.

Figure 2:
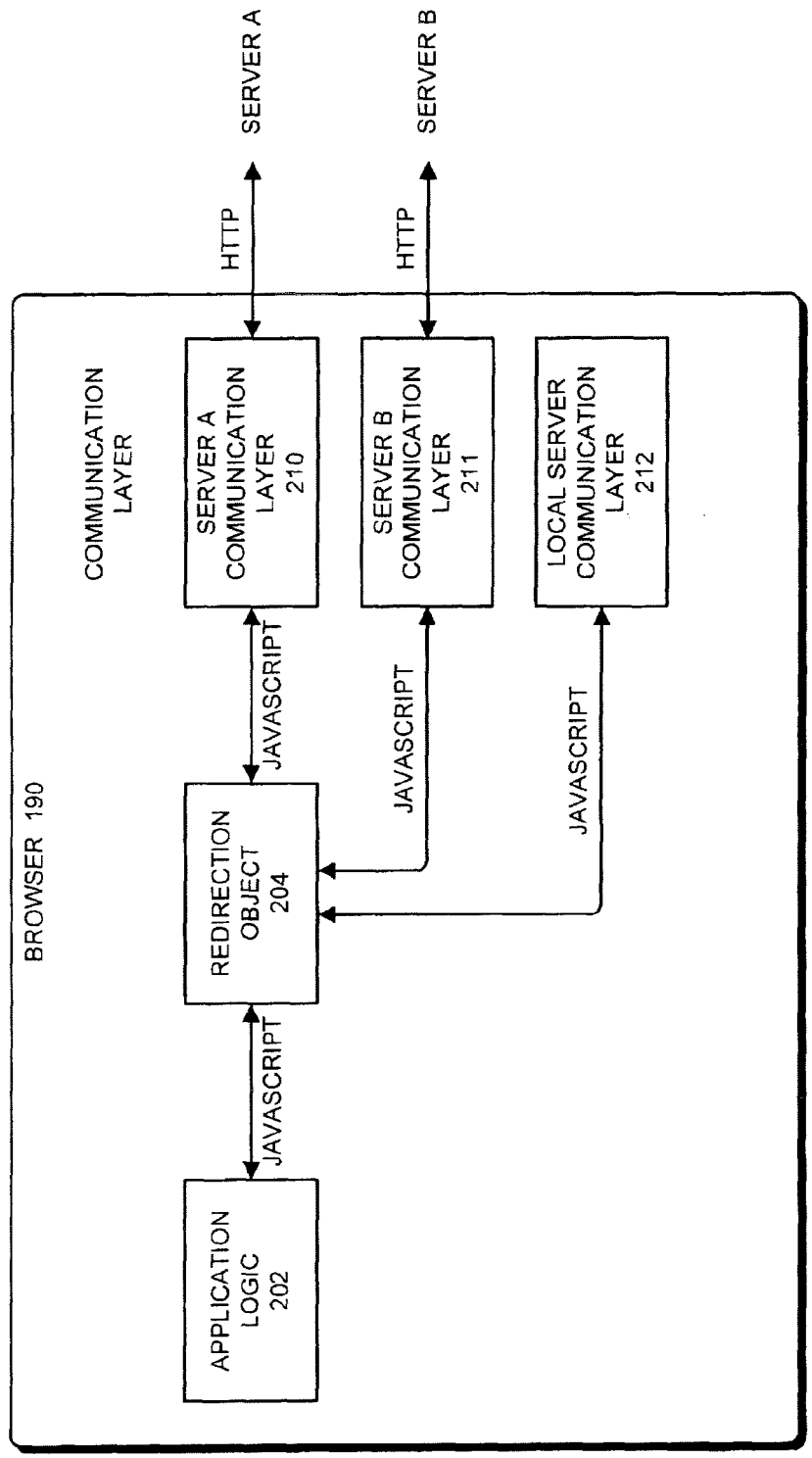
FIG. 2 illustrates a browser in accordance with an embodiment of the present invention.

FIG. 2 illustrates a browser 190 in accordance with an embodiment of the present invention. Browser 190 includes: application logic 202, redirection object 204, server A communication layer 210, server B communication layer 211, and local server communication layer 212. In a traditional web application, application logic 202 is coupled to server communication layer 210, and communicates with server A via server A communication layer 210. However, embodiments of the present invention include a redirection object 204 which may direct function calls: (1) to server A communication layer 210, (2) to the communication layer associated with another remote server (such as server B communication layer 211), or (3) to a different resource (such as local server communication layer 212). Note that browser 190 can execute on any node including computational capability, including clients 110-112, servers 130-150, and devices 180.

In some embodiments of the present invention, application logic 202 communicates with redirection object 204, and redirection object 204 communicates with: server A communication layer 210, server B communication layer 211, and local server communication layer 212 via JavaScript™. While JavaScript™ is shown in these embodiments, in general any method for communicating between these components may be used.

Redirection object 204 intercepts function calls to the communications layer and redirects these calls based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources which are internal and/or external to client 110, such as database 170.

In some embodiments of the present invention, redirection object 204 directs the function calls to local server communication layer 212. Local server communication layer 212 acts as a liaison between browser 190 and a local server executing on the same client 110 as browser 190. Such a redirection may be beneficial in cases where client 110 is disconnected from network 160, and thus has no connection to the intended resource.

Note that the local server executing on client 110 may include code that performs the same functionality as the server code, or alternatively, cached copies of the server code, including any server-side scripting, such as Java Server Pages (JSP) code and Active Server Pages (ASP) code. In this example, the local server processes the server-side code in lieu of the intended server. Furthermore, the end-result is transparent to the user 120.

To user 120, it appears no different than if redirection object 204 forwarded the function call to the intended server rather than to the local server.

In one embodiment of the present invention, a programmer identifies the functions and methods that call the server, and then creates proxies for those functions. Note that this is possible in JS because JS is a dynamic language that allows the redefinition of functions and methods at runtime. In this embodiment, the programmer redefines the function so that the function tests which server to use, and then calls the desired server implementation.

FIG. 3A illustrates an Asynchronous JavaScript and XML (AJAX) function prior to modification in accordance with an embodiment of the present invention. FIG. 3B illustrates a proxy AJAX function in accordance with an embodiment of the present invention. In the example illustrated in FIG. 3B, a programmer does not have to modify every single function, but instead, can centralize the communication layer to one single entry point. When writing the code for the application, the programmer can simply make each function call via the createProxy (f-type) function. Note that for embodiments of the present invention, a proxy function is defined as a function that is invoked in place of an existing function, and then determines whether to invoke the existing function, to invoke an alternate function, or to invoke the existing function with different arguments. This is in contrast to a "proxy" that stores content at the proxy and acts on behalf of existing servers by returning content from the proxy rather than from the servers when requests are made.

FIG. 4 presents a flow chart illustrating the process of redirecting a function call in accordance with an embodiment of the present invention. During operation, the system receives a function call at redirection object 204 (operation 402) and determines the intended resource for the function call (operation 404). Next, the system determines if the function call should be directed to an alternate resource (operation 406). Note that this redirection decision is based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources internal and/or external to client 110, such as database 170.

If the function call should be directed to an alternate resource, redirection object 204 redirects the function call to the alternate resource (operation 408). However, if not, redirection object 204 forwards the function call to the intended resource (operation 410).

In below, another embodiment of the present invention is described. Another embodiment of the present invention presents the method for user to use the web application same as online status, even if the application is not connected with web server (offline status).

Figure 5:
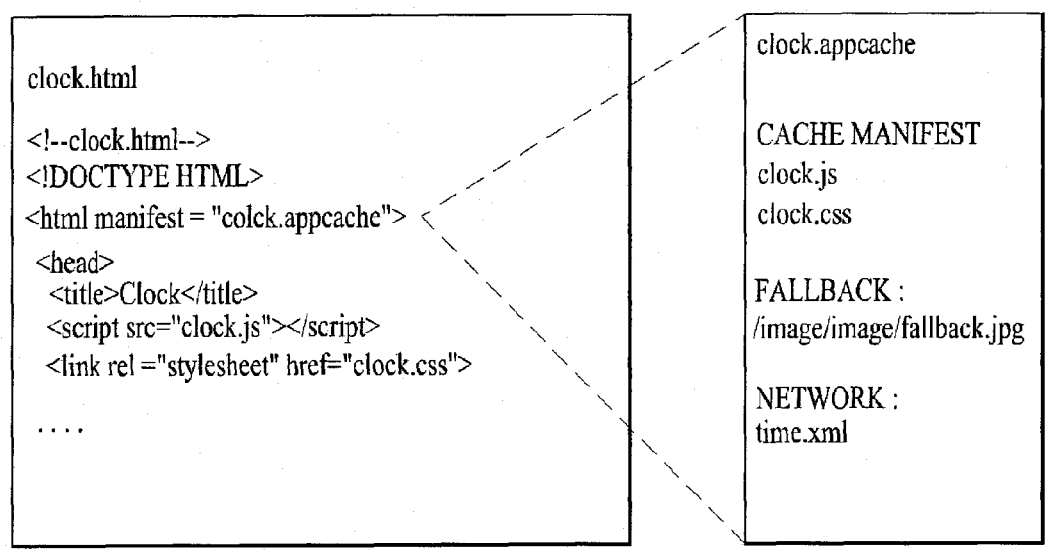
FIG. 5 illustrates a markup file for storing web resource in accordance with the other embodiment of the present invention.

FIG. 5 illustrates a markup file for storing web resource in accordance with the other embodiment of the present invention.

The markup file of FIG. 5 provides the method how to operate same as online status, even if on offline status, using cache of web application.

As shown in drawings of "clock.html", the markup file of the present invention specifies a manifest file that is used in the markup file, for example, it may be specified as "<html manifest="..." ">".

As shown in the drawing, CACHE MANIFEST section, FALLBACK section, and NETWORK section are specified in the manifest file.

The CACHE MANIFEST section specifies the web resource files temporarily storing from web pages.

And, the FALLBACK section specifies web resource files, which are used instead when the web resource files stored temporarily, do not exist in the cache, and on offline.

And, the NETWORK section specifies the list of web resource files downloadable from the web page on the online status.

Therefore, web application uses web resource files needed to output web page and stored in the cache, if it is in the caches, using the aforementioned markup file. And, when web resource files are updated, web application downloads the web resource files that are specified in the CACHE MANIFEST section to the cache for future access, or offline if you are using.

However, some web resources stored in the cache of the web application (main image, for example, real-time data, etc.) can be updated frequently from the Web server. Thus, the problem is how to update the web resources even if the user does not connect directly to the web server using web applications.

In below, the method for updating web resource periodically is described.

Figure 6:
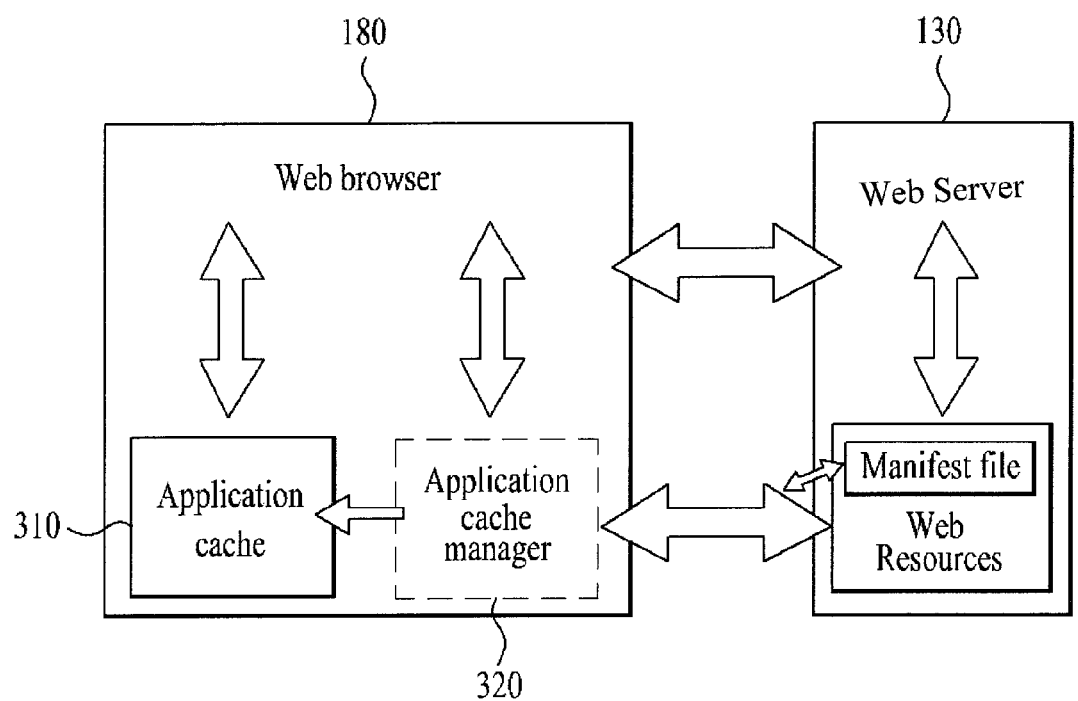
FIG. 6 illustrates a browser in accordance with the other embodiment of the present invention.

FIG. 6 illustrates a browser in accordance with the other embodiment of the present invention.

The browser 180 of the present invention further includes application cache 310 and application cache manager 320.

The application cache 310 is temporary data storage for storing web resource files downloaded from the web server by the browser 180.

The application cache manager 320 connects to the web server, and checks for updates of the web resource, and downloads the updated web resource to application cache 310, using markup file which will be described later Therefore, application cache manager (320) periodically checks for updates of the web resource, and downloads the updated web resource to application cache 310 automatically, according to the period information specified in the markup file which will be described later.

However, the drawings illustrates the application cache manager 320 is included in the browser 180, but this example, and the application cache manager 320 may be presented as separated the background service.

FIG. 7 illustrates a markup file including period information in accordance with the other embodiment of the present invention.

As shown in FIG. 7, the manifest file of the markup file further includes the PERIODICAL section 400.

The period information is specified in the PERIODICAL section 400. Therefore, the application cache manager (320) checks updated web resource in the corresponding period, downloads automatically the updated resource from the Web server to the application cache 310 according to the period information which is specified in the PERIODICAL section 400.

That is, the time information when the application cache manager 320 checks and downloads the web resource is included in the period information of the PERIODIC section 400.

The subject and the elements specified in PERIODIC section 400 can be set various settings as follows.

First of all, at least one of the author of the web application and the user of the web application and web application can determine the foregoing period information.

First of all, the author of the web application can record the period information explicitly, when the author of the web application creates the PERIODIC section 400 of the manifest file . . . .

And, the user of the web application can set up the period information for each Web application through the web application manager or general preference settings.

And, the web applications can set up to decide the period information automatically.

Finally, the combination of the aforementioned three subjects can also determine the period information. That is, period information can be set by the author of web application, the user of web application and web applications in order of priority.

And, the PERIODIC section (400) can be determined through the following elements.

That is, the periodic information can be set up considering to the Web server's priority, specified period, the number of visits (frequency of use), the recently visited site, the visit history, the update frequency of web resource, the current network usage, the network situation (3G/Wifi/wired/roaming/etc), whether the amount remaining in the current plan data, the current time (day or night) and etc.

Therefore, the author of the web application, the web application's user and web applications can be set up the periodic information based on the aforementioned factors.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for using a web-based client-server application offline, the method comprising:

reading a markup file that includes a list of web resource files and period information, the period information specified in the markup file being time information set up based on an amount remaining in a current plan data, wherein the period information is further set by web server's priority, a visit history, a current network usage, and a recently visited site, wherein reading the markup file includes reading, from a manifest file in the markup file, the time information set based on the total number of visits;

connecting periodically to a web server based on the period information specified in the manifest file of the markup file;

downloading, to a cache, at least one web resource file included in the list of the markup file from the web server;

checking periodically whether the web resource file is updated in the web server based on the period information specified in the manifest file of the markup file;

updating the at least one web resource file from the web server to the cache;

presenting a web page using the downloaded web resource file and the updated web source file on offline status;

presenting the web page using an alternative web resource file when the downloaded web resource file or the updated web resource file do not exist in the cache on offline status, wherein the alternative web resource file is specified in the markup file.

2. The method of claim 1, wherein the period information is further set up by at least one of an author of the application and a user of the application.

3. The method of claim 1, wherein the period information is further set up based on at least one of a network situation (3G/Wifi/wired/roaming/etc.), and a current time (day or night).

4. A non-transitory computer-readable storage medium storing instructions that when executed by a computer cause the computer to perform a method for using a web-based client-server application offline, the method comprising:

reading a markup file that includes a list of web resource files and period information, the period information specified in the markup file being time information set up based on an amount remaining in a current plan data, wherein the period information is further set by web server's priority, a visit history, a current network usage, and a recently visited site, wherein reading the markup file includes reading, from a manifest file in the markup file, the time information set based on the total number of visits;

connecting periodically to a web server based on the period information specified in the markup file;

downloading, to a cache, at least one web resource file included in the list of the markup file from the web server;

checking periodically whether the web resource file is updated in the web server based on the period information specified in the manifest file;

updating the at least one web resource file from the web server to the cache;

presenting a web page using the downloaded web resource file and the updated web resource file on offline status; and presenting the web page using an alternative web resource file when the downloaded web resource file or the updated web resource file do not exist in the cache on offline status, wherein the alternative web resource file is specified in the markup file.

5. The non-transitory computer-readable storage medium of claim 4, wherein the period information is further set up by at least one of an author of the application and a user of the application.

6. The non-transitory computer-readable storage medium of claim 4, wherein the period information is further set up based on at least one of a network situation (3G/Wifi/wired/roaming/etc.), and a current time (day or night).

7. A method for using a web-based client-server application offline, the method comprising:

reading a manifest file in a markup file, the markup file including a list of web resource files and period information, the period information specified in the markup file being time information set up by an amount remaining in a current plan data, wherein the period information is further set by web server's priority, a visit history, a current network usage, and a recently visited site, wherein reading the manifest file includes reading, from the manifest file, the time information set up by a current network usage;

connecting periodically to a web server based on the period information specified in the markup file;

downloading, to a cache, the web resource file included in the markup file from the web server based on the period information specified in the manifest file of the markup file;

presenting a web page using the downloaded web resource file on offline status; and presenting the web page using an alternative web resource file when the downloaded web resource file does not exist in the cache on offline status, wherein the alternative web resource file is specified in the markup file.

8. The method of claim 7, wherein the period information is further set up by at least one of an author of the application and a user of the application.

* * * * *